(12) United States Patent
De Valcourt

(10) Patent No.: US 6,227,593 B1
(45) Date of Patent: May 8, 2001

(54) TRUCK BED EXTENDER/RAMP

(76) Inventor: Richard K. De Valcourt, 111 Trafalgar Square, Slidell, LA (US) 70461

( * ) Notice: Subject to any disclaimer, the term of this patent is extended or adjusted under 35 U.S.C. 154(b) by 0 days.

(21) Appl. No.: 09/270,728

(22) Filed: Mar. 17, 1999

Related U.S. Application Data

(60) Provisional application No. 60/073,946, filed on Feb. 6, 1998.

(51) Int. Cl.⁷ ....................................................... B62C 1/06
(52) U.S. Cl. .................... 296/26.08; 296/37.6; 296/37.1; 296/61
(58) Field of Search ............................... 296/26.08, 37.6, 296/37.1, 61, 62; 414/537

(56) References Cited

U.S. PATENT DOCUMENTS

| | | | |
|---|---|---|---|
| 3,713,553 | * 1/1973 | Curtis et al. ............................. | 296/61 |
| 4,098,414 | * 7/1978 | Abiera ..................................... | 296/61 |
| 4,199,186 | * 4/1980 | Faverino ................................. | 296/37.1 |
| 4,478,549 | 10/1984 | Stelly et al. . | |
| 4,596,417 | * 6/1986 | Bennett .................................. | 296/61 |
| 4,662,020 | * 5/1987 | Wilkerson ............................. | 296/37.1 |
| 4,668,002 | * 5/1987 | Hanson .................................. | 296/61 |
| 4,944,546 | 7/1990 | Keller . | |
| 5,133,584 | * 7/1992 | McCleary ............................... | 296/61 |
| 5,156,432 | * 10/1992 | McCleary ............................... | 296/61 |
| 5,211,437 | 5/1993 | Gerulf . | |
| 5,287,579 | 2/1994 | Estevez, Jr. . | |
| 5,342,105 | * 8/1994 | Miles ...................................... | 296/61 |
| 5,468,114 | * 11/1995 | Hickerson .............................. | 296/61 |
| 5,509,709 | * 4/1996 | Carroll .................................. | 296/37.6 |
| 5,538,308 | * 7/1996 | Floe ....................................... | 296/61 |
| 5,540,474 | * 7/1996 | Holland ................................. | 296/61 |
| 5,553,762 | 9/1996 | Brown . | |
| 5,597,195 | * 1/1997 | Meek ..................................... | 296/61 |
| 5,658,033 | * 8/1997 | Delaune ............................. | 296/26.08 |
| 5,788,311 | * 8/1998 | Tibbals .................................. | 296/62 |
| 5,791,717 | * 8/1998 | Reich et al. .......................... | 296/61 |
| 5,816,638 | * 10/1998 | Pool, III ................................ | 296/61 |
| 5,823,596 | * 10/1998 | Kulesza ................................ | 296/37.6 |
| 5,988,725 | * 11/1999 | Cole ....................................... | 296/61 |
| 5,997,066 | * 12/1999 | Scott ................................. | 296/26.08 |

* cited by examiner

Primary Examiner—Joseph D. Pape
Assistant Examiner—Kiran Patel
(74) Attorney, Agent, or Firm—Garvey, Smith, Nehrbass & Doody, L.L.C.

(57) ABSTRACT

A ramp for motorcycles and lawn mowers folds up into a gate to fit on top of a tailgate of a pickup truck to extend the truck bed onto the open tailgate.

13 Claims, 8 Drawing Sheets

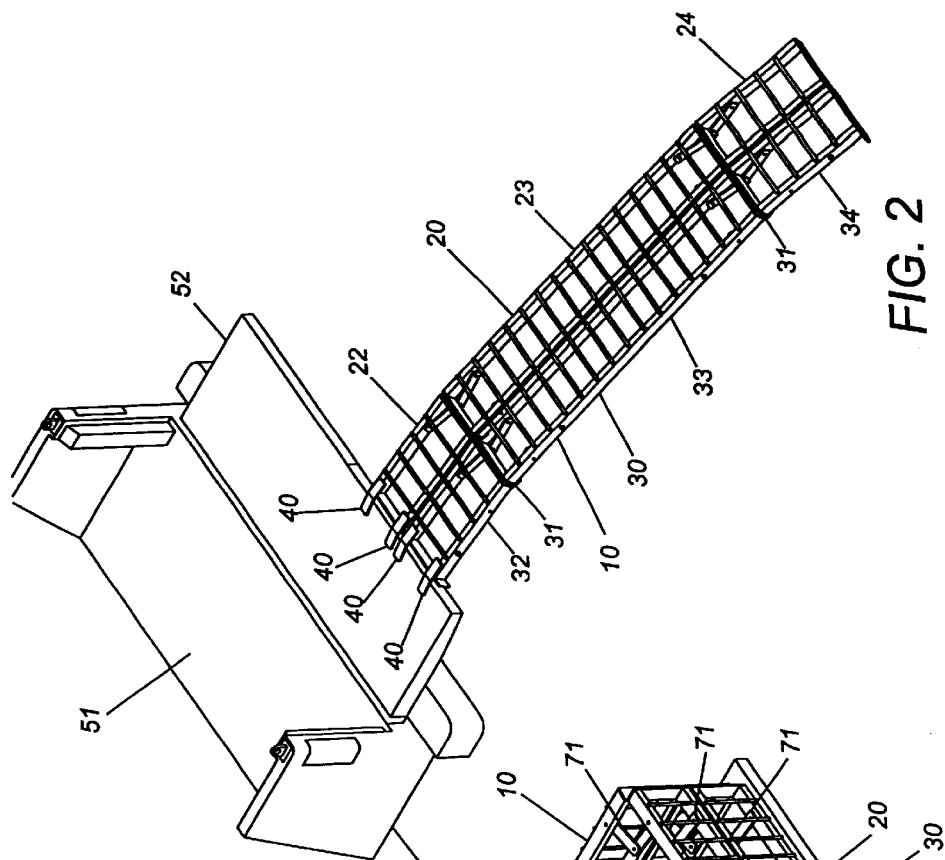
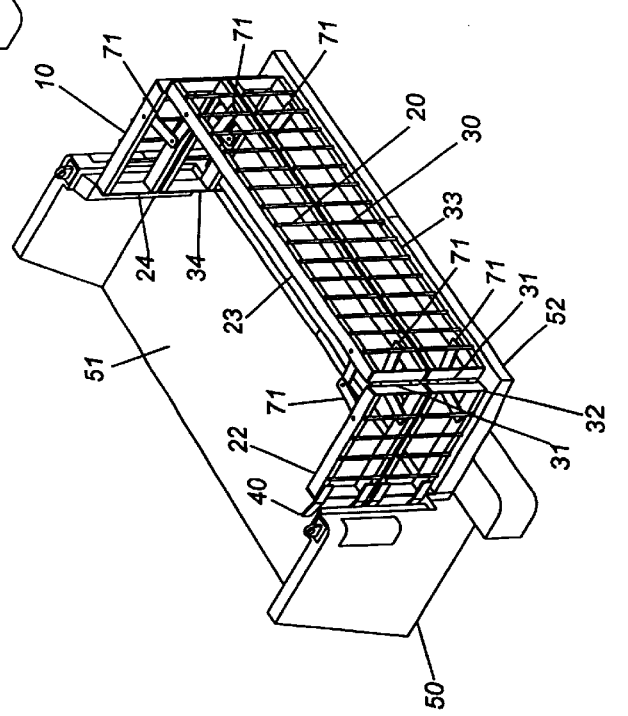

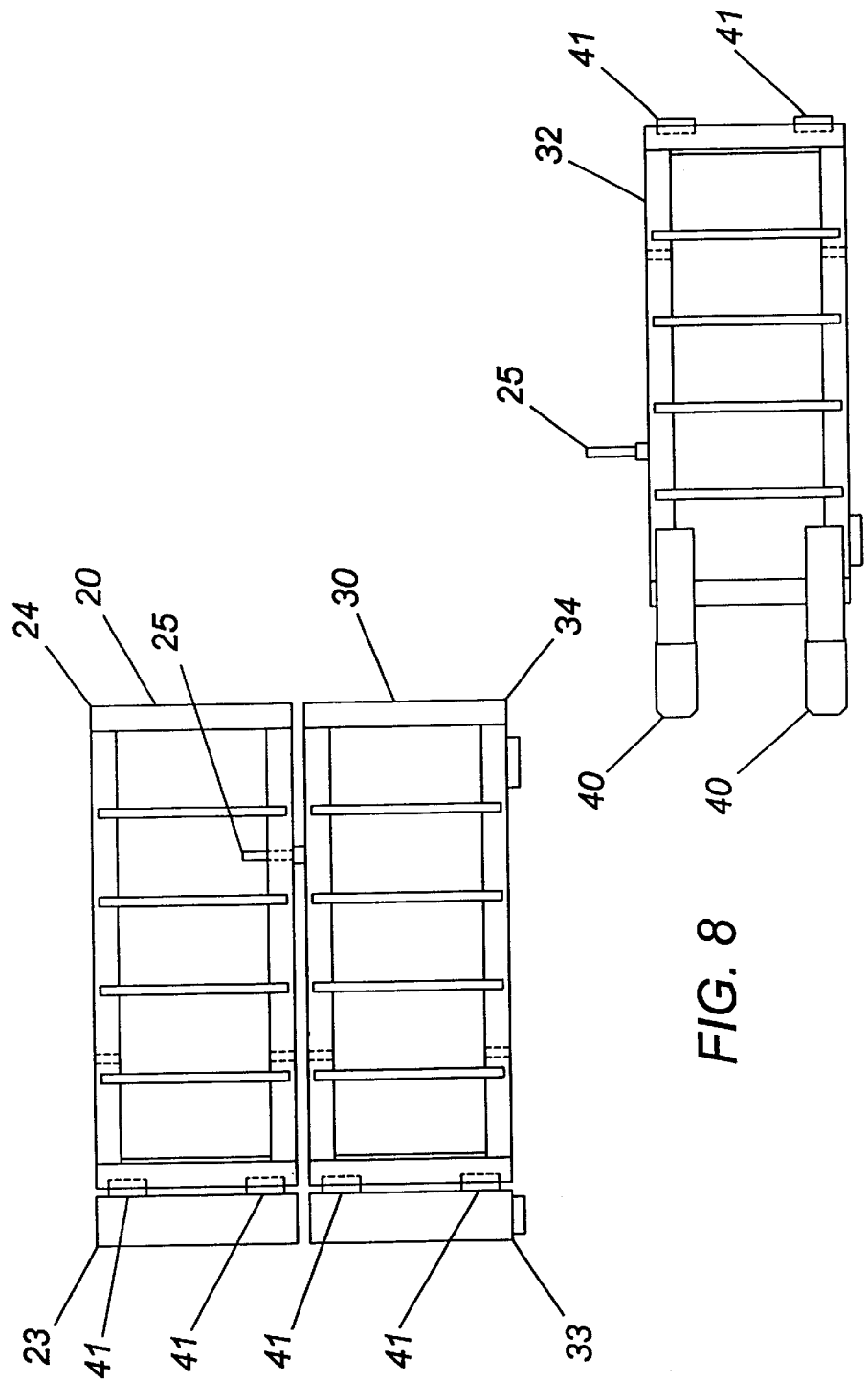

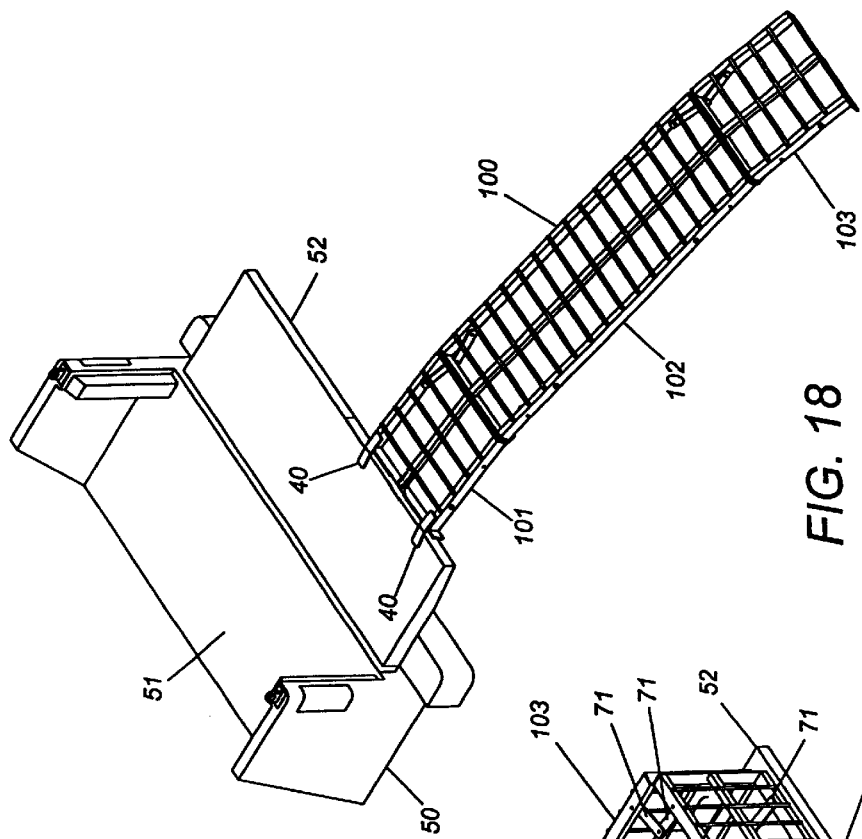
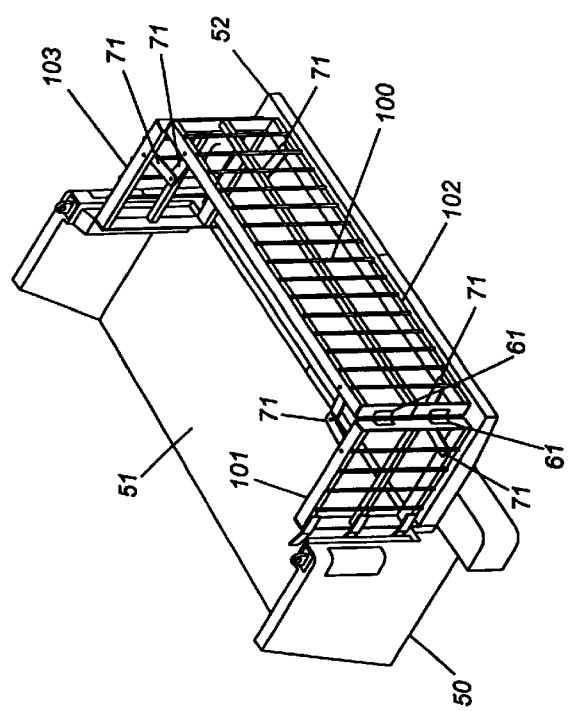

TRUCK BED EXTENDER/RAMP

CROSS-REFERENCE TO RELATED APPLICATIONS

My U.S. Provisional patent application Ser. No. 60/073,946, filed Feb. 2, 1998, is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to ramps for pickup trucks. More particularly, the present invention relates to ramps for pickup trucks and pickup truck tailgates.

2. General Background of the Invention

Transporting motorcycles in the back of pickup trucks can be a chore, both because it can be difficult to get the motorcycles in the back of the pickup truck and because the bed of the truck is often not long enough to hold a motorcycle.

A product called an "AMP Xtender", commercially available from AMP Research of Laguna Hills, Calif. and shown in an ad on page 84 of the Feb. 1997 issue of Motocross Action serves to effectively extend the length of a truck bed by providing a gate which fits atop the tailgate of a pickup truck. However, it does not solve the problem of getting motorcycles into the truck.

The following U.S. Pat. Nos. are incorporated herein by reference: 4,596,417; 4,944,546; 4,478,540; 4,668,002; 5,287,579; 5,211,437; 5,538,308; 5,553,762; and 5,700,047.

BRIEF SUMMARY OF THE INVENTION

The apparatus of the present invention solves the problems confronted in the art in a simple and straightforward manner. What is provided is a truck bed extender which can also function as a folding ramp or ramps for loading wheeled vehicles into a pickup truck.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 shows a first embodiment of the present invention used as a truck bed extender;

FIG. 2 shows the first embodiment of the present invention used as a single ramp;

FIGS. 8 and 9 are details of the first embodiment of the present invention;

FIG. 17 is a side rear perspective view of a pickup truck on which is mounted the third embodiment of the present invention in a truck-bed extender position; and FIG. 18 is a side perspective view of a pickup truck on which is mounted the third embodiment of the present invention in a ramp position.

DETAILED DESCRIPTION OF THE INVENTION

Figure 4:
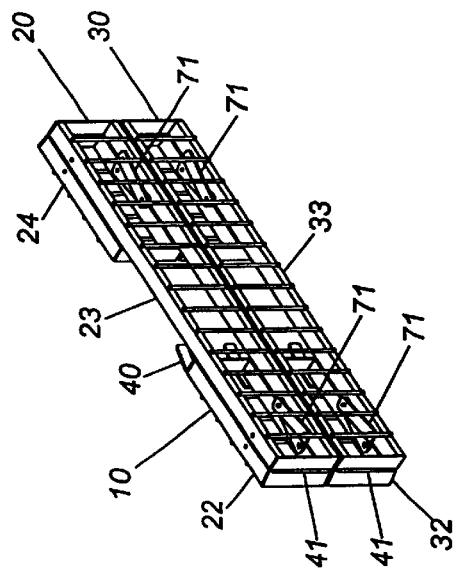
FIG. 4 shows the first embodiment of the present invention in a folded position.

The first embodiment of the apparatus of the present invention is a truck bed extender/loading ramp 10. Truck bed extender/loading ramp 10 can advantageously be used for loading a wheeled vehicle into a pickup truck 50 having a bed 51 and a tailgate 52 and for extending the bed onto the tailgate. Truck bed extender/loading ramp 10 comprises a first folding ramp 30 for loading a wheeled vehicle (such as a motorcycle 47) into a pickup truck 50, the folding ramp having means (hinged connections 31) for allowing the ramp to be folded into a truck bed extender. Truck bed extender/loading ramp 10 further comprises a second folding ramp 20 removably attachable to the first folding ramp 30 (as with connecting studs 25).

Truck bed extender/loading ramp 10 comprises means (tongues 40) for holding the first folding ramp 30 onto the tailgate 52 when the apparatus 10 is functioning as a ramp. Truck bed extender/loading ramp 10 also comprises means for holding the first folding ramp 30 onto the tailgate 52 when the apparatus 10 is functioning as a truck bed extender. The first folding ramp 30 is made of three sections, a left section 32, a central section 33, and a right section 34. As shown in the drawings, the central section 33 has a length approximately equal to the width of the tailgate 52 and the left 32 and right 34 sections each have a length approximately equal to the length of the tailgate 52.

Figure 3:
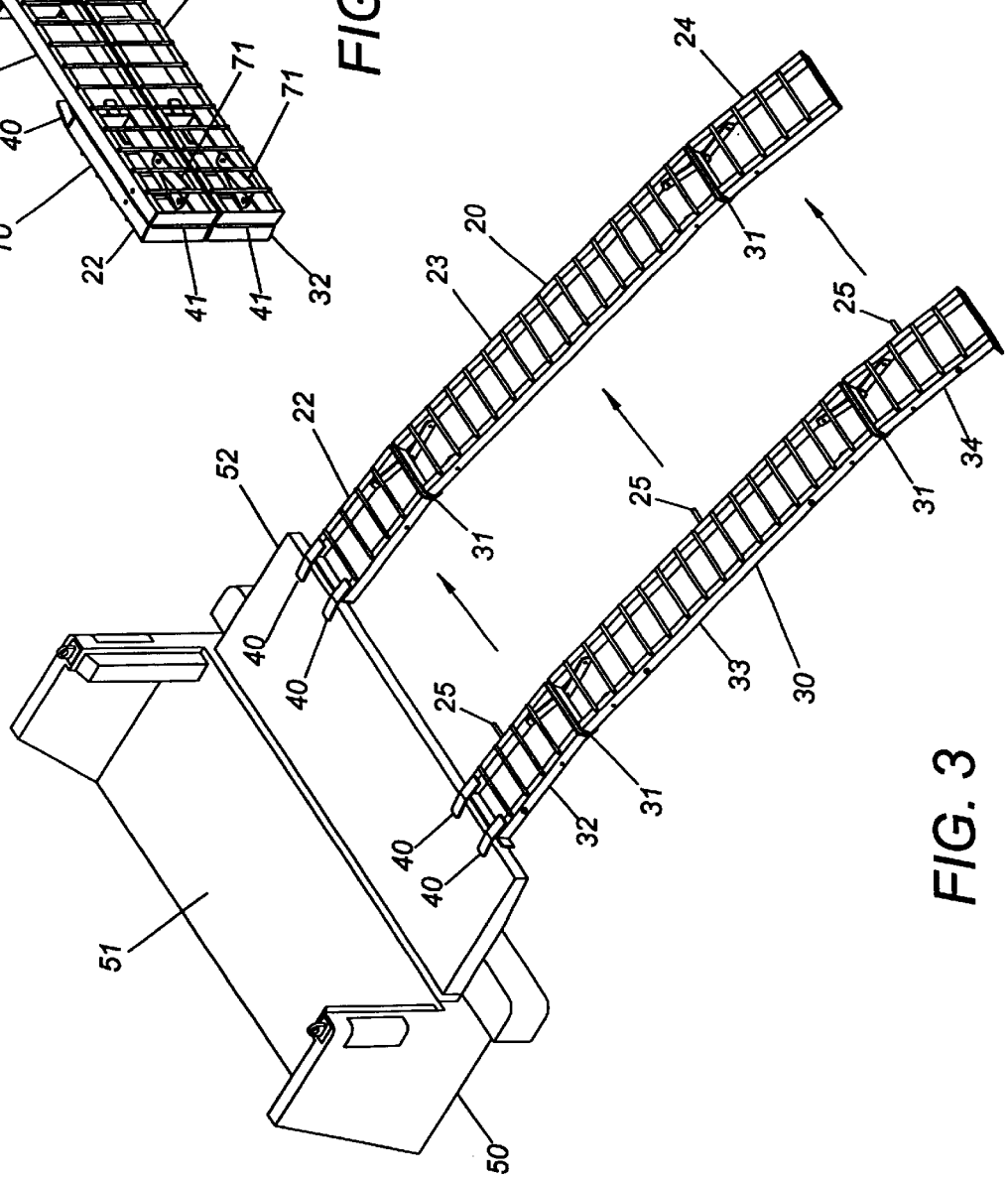
FIG. 3 shows the first embodiment of the present invention used as two ramps.

As can be seen in the drawings, the apparatus 10 can switch between a tailgate extender (FIG. 1) and a single ramp configuration (FIG. 2) and a double ramp configuration (FIG. 3).

Ramps 20 and 30 are preferably made strong enough (as of aluminum) to support motorcycles and lawnmowers which are of a size to be able to roll up the ramps.

Figures 10, 11:
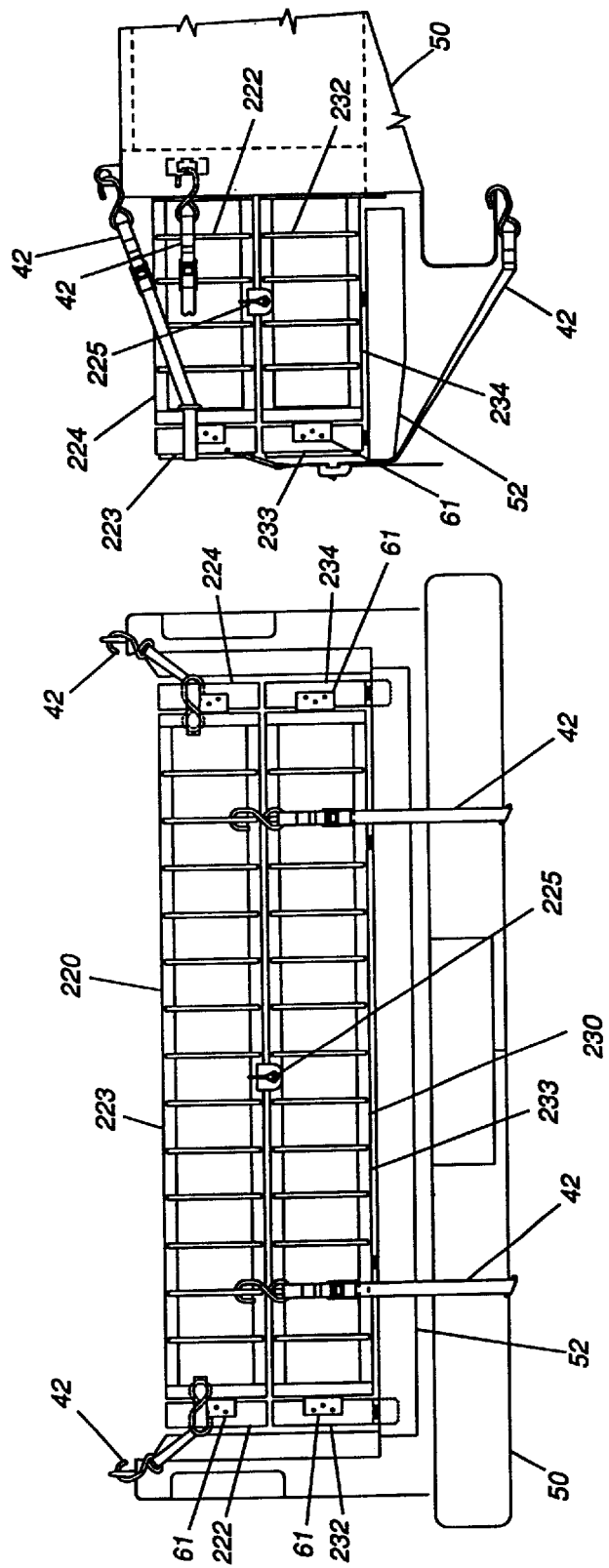
FIG. 10 is a rear view of a pickup truck on which is mounted the second embodiment of the present invention.
FIG. 11 is a side view of a pickup truck on which is mounted the second embodiment of the present invention in a truck-bed extender position.
Figure 12:
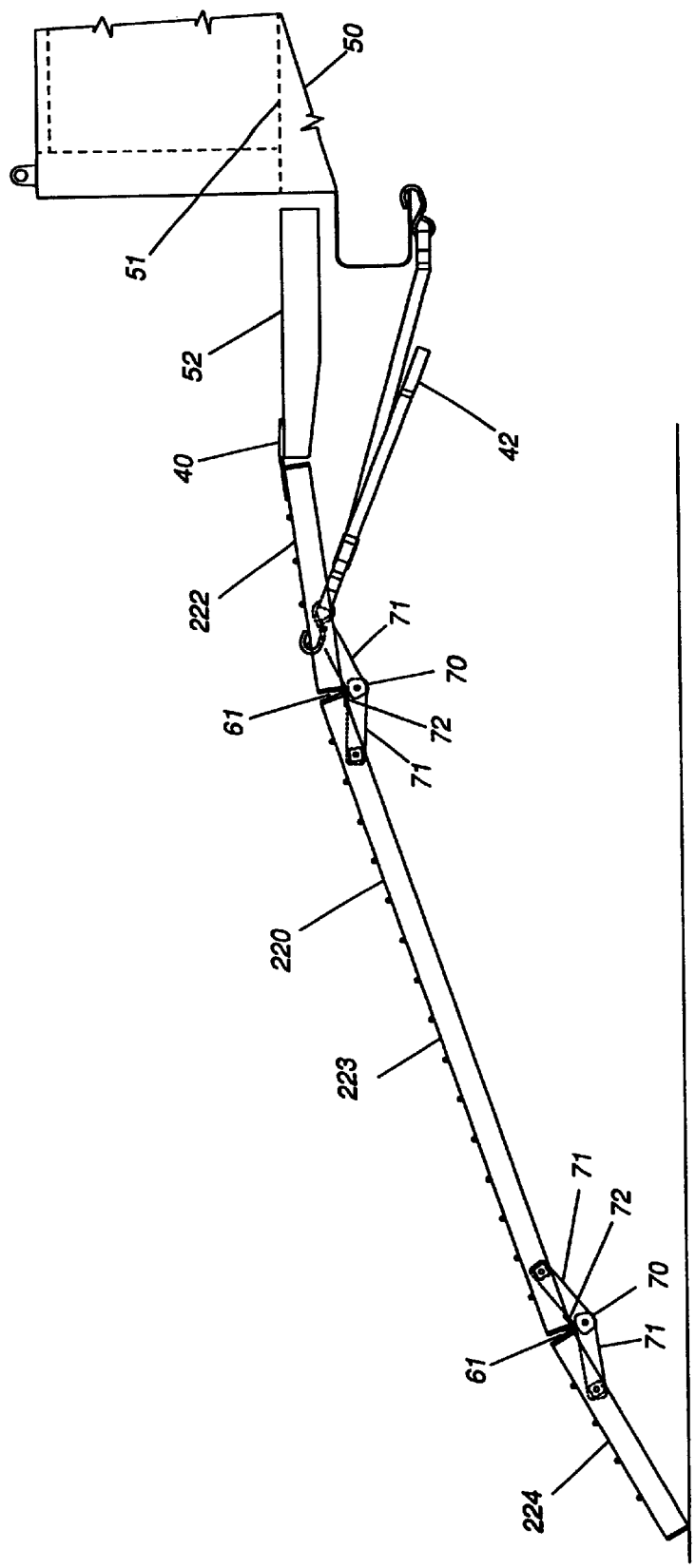
FIG. 12 is a side view of a pickup truck on which is mounted the second embodiment of the present invention in a ramp position.
Figure 15:
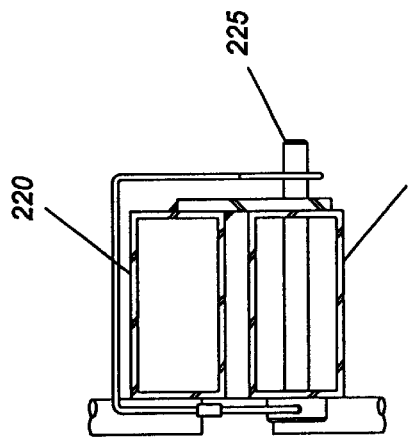
FIG. 15 is a detail of the ramp of the second embodiment of the present invention taken along the lines XV—XV in FIG. 14.
Figure 16:
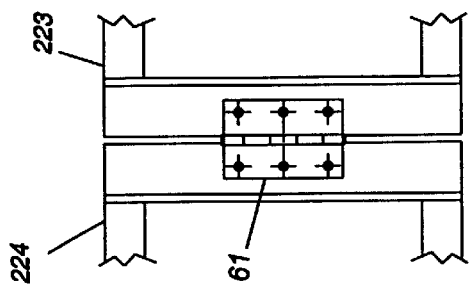
FIG. 16 is a detail of the second embodiment of the present invention.
Figure 13:
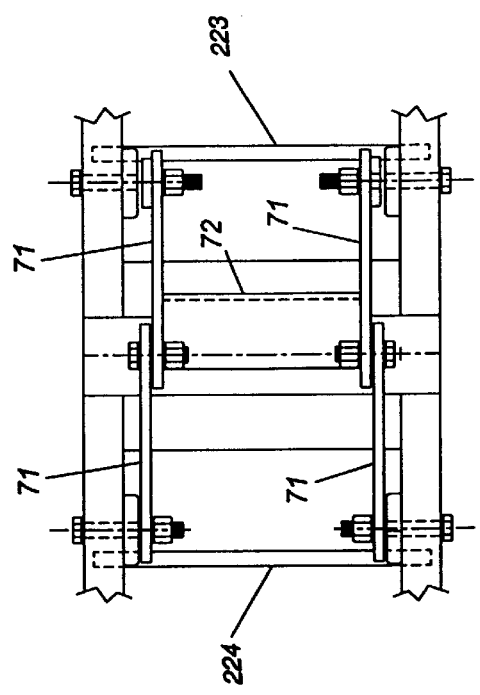
FIG. 13 is a detail of the ramp of the second embodiment of the present invention in an open position.
Figure 14:
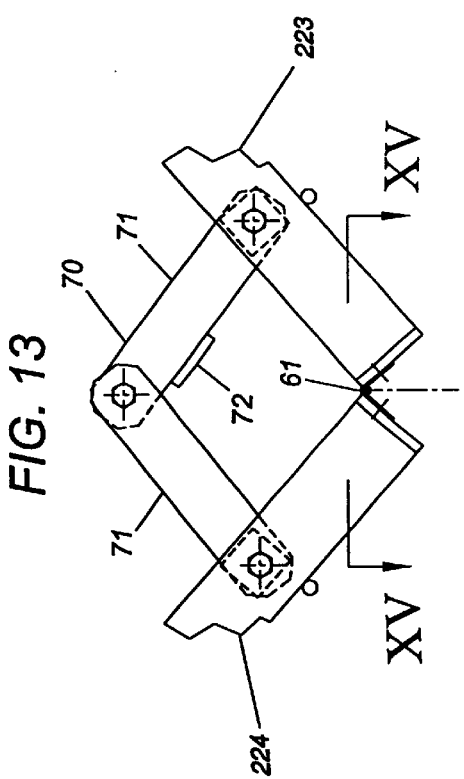
FIG. 14 is a detail of the ramp of the second embodiment of the present invention in a partially open position.

The second embodiment of the present invention is shown in FIGS. 10 16. This embodiment differs from the first embodiment in a number of ways. First, the pipe-type hinges 41 are replaced with screw-on-type utility hinges 61. The connecting stud 25 was changed to make use of an RV-type locking pin 225, as shown in FIGS. 10, 11, and 16. FIGS. 10 and 11 show how the ramps 220 and 230 secured to the tailgate as a bed extender using utility straps 42. The utility straps 42 have a dual purpose that is shown. The straps 42 are used to hold the ramps 220 and 230 to prevent slipping off the end of the tailgate 52 when loading or unloading.

The ramp when folded can also be stored inside the cab of the pickup truck for security.

By changing the length of the central section of the ramp, the present invention can be sized to fit all different types and sizes of pickup truck.

The third embodiment of the apparatus of the present invention is a truck bed extender/loading ramp 100 (see FIGS. 17 and 18). This embodiment differs from the first embodiment in that it offers a single ramp design only. Truck bed extender/loading ramp 100 can advantageously be used for loading a wheeled vehicle (such as a motorcycle 47) into a pickup truck 50 having a bed 51 and tailgate 52 and for extending the bed onto the tailgate in the same way that truck bed extender/loading ramp 10 is used.

Truck bed extender/ramp 100 comprises means (tongues 40) for holding the first folding ramp 101 onto the tailgate 52 when the apparatus 100 is functioning as a ramp. Truck bed extender/loading ramp 100 also comprises a means for holding the first folding ramp 101 onto the tailgate 52 when the apparatus 100 is functioning as a truck bed extender. The ramp 100 is made of three sections, a left section 101, a central section 102, and a right section 103. As shown in the drawings, the central section 102 has a length approximately equal to the width of the tailgate 52 and the left 101 and the right 103 sections each have a length approximately equal to the length of the tailgate 52.

As can be seen in the drawings, the apparatus 100 can switch between a tailgate extender (FIG. 17) and a single ramp configuration (FIG. 18).

Ramp sections 101, 102 and 103 are preferably made strong enough (as of aluminum) to support motorcycles which are of a size to be able to roll up the ramp.

Figure 7:
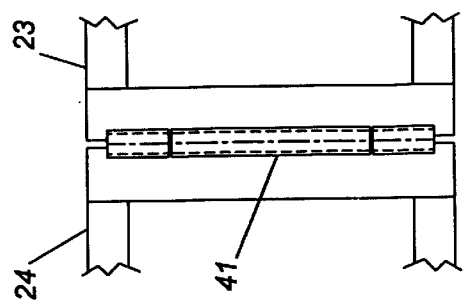
FIG. 7 is a detail of the second ramp of the first embodiment of the present invention taken along the lines VII—VII in FIG. 6.
Figure 5:
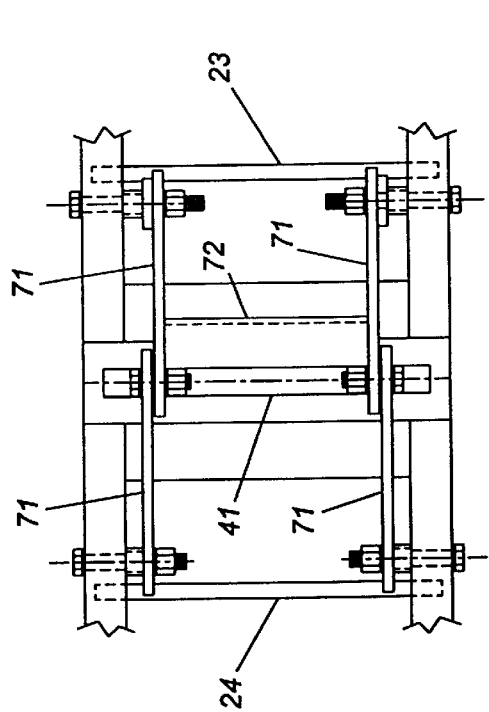
FIG. 5 is a detail of the second ramp of the first embodiment of the present invention in an open position.
Figure 6:
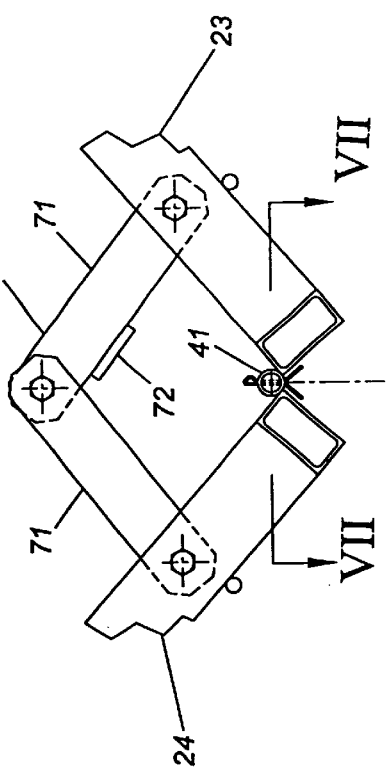
FIG. 6 is a detail of the second ramp of the first embodiment of the present invention in a partially open position.

All ramps disclosed herein preferably have sections attached to one another with hinges 41, 61 and link assemblies 70 (see FIGS. 5–7). Each link assembly 70 includes four legs 71 and a bearing bar 72 welded or otherwise attached to the lower two legs 71 of link assembly 70. The lower two legs 71 are bolted or otherwise rotatably attached to one section of the ramp, and the upper two legs 71 are bolted or otherwise rotatably attached to the section of the ramp which is above the section to which the lower two legs are attached. Each upper leg 71 is bolted or otherwise rotatably attached to one lower leg 71. Link assemblies 70 serve to hingedly attach the ramp sections together and to provide support when the ramp sections are opened up into a ramp (the lower section of the ramp connected to each link assembly rests on the bearing bar 72 when the ramp is opened up and prevents further travel of the ramp sections).

PARTS LIST:

The following is a list of parts and materials suitable for use in the present invention:
10 truck bed extender/ramp of the first embodiment of the present invention (preferably made of aluminum)
20 second folding ramp
22 left section of second folding ramp 20
23 central section of second folding ramp 20
24 right section of second folding ramp 20
25 connecting studs on ramp 30
30 first folding ramp
31 hinged connection
32 left section of first folding ramp 30
33 central section of first folding ramp 30
34 right section of first folding ramp 30
40 tongues (preferably vinyl-coated aluminum)
41 pipe-type hinges
42 utility straps
47 motorcycle
50 pickup truck
51 bed
52 tailgate
61 screw-on-type utility hinges
70 link assemblies
71 legs
72 bearing bar
100 ramp
101 left section
102 central section
103 right section
220 folding ramp
222 left section of folding ramp 220
223 central section of folding ramp 220
224 right section of folding ramp 220
225 RV-type locking pin
230 folding ramp
232 left section of folding ramp 230
233 central section of folding ramp 230
234 right section of folding ramp 230

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. Apparatus for loading a wheeled vehicle into a pickup truck having a bed and a tailgate and for extending the bed onto the tailgate, comprising:

a first folding ramp for loading a wheeled vehicle into a pickup truck, the folding ramp having means for allowing the ramp to be folded into a truck bed extender wherein the first folding ramp is made of three sections, a left section, a central section, and a right section:

the central section has a length approximately equal to the width of the tailgate:

the left and right sections each have a length approximately equal to the length of the tailgate:

the central section is connected to the left section with a first hinge means and a first link assembly:

the central section is connected to the right section with a second hinge means and a second link assembly, the first link assembly includes four legs, two legs being connected to the left section and two legs being connected to the central section, the two legs connected to the central section themselves being connected with a bearing bar which limits travel of the left section relative to the central section: and the second link assembly includes four legs, two legs being connected to the central section and two legs being connected to the right section, the two legs connected to the right section themselves being connected with a bearing bar which limits travel of the right section relative to the central section.

2. The apparatus of claim 1, further comprising:

a second folding ramp removably attachable to the first folding ramp.

3. The apparatus of claim 1, further comprising:

means for holding the first folding ramp onto the tailgate when the apparatus is functioning as a ramp.

4. The apparatus of claim 1, further comprising:

utility straps for holding the first folding ramp onto the tailgate when the apparatus is functioning as a truck bed extender.

5. The apparatus of claim 2, further comprising:

connecting studs for removably attaching the second folding ramp to the first folding ramp.

6. A folding ramp apparatus comprising:

a left section;

a central section connected to the left section with a first hinge means and a first link assembly, a right section connected to the central section with a second hinge means and a second link assembly, wherein:

the first link assembly includes four legs, two legs being connected to the left section and two legs being connected to the central section, the two legs connected to the central section themselves being connected with a bearing bar which limits travel of the left section relative to the central section: and the second link assembly includes four legs, two legs being connected to the central section and two legs being connected to the right section, the two legs connected to the right section themselves being connected with a bearing bar which limits travel of the right section relative to the central section.

7. Apparatus for loading a wheeled vehicle into a pickup truck having a bed and a tailgate and for extending the bed onto the tailgate, comprising:

a first folding ramp for loading a wheeled vehicle into a pickup truck, the folding ramp having means for allowing the ramp to be folded into a truck bed extender; and utility straps for holding the first folding ramp onto the tailgate when the apparatus is functioning as a truck bed extender.

8. The apparatus of claim 7, further comprising:

a second folding ramp removably attachable to the first folding ramp.

9. The apparatus of claim 7, further comprising:

means for holding the first folding ramp onto the tailgate when the apparatus is functioning as a ramp.

10. The apparatus of claim 8, further comprising:

utility straps for holding the second folding ramp onto the tailgate when the apparatus is functioning as a truck bed extender.

11. The apparatus of claim 7, wherein:

the first folding ramp is made of three sections, a left section, a central section, and a right section;

the central section has a length approximately equal to the width of the tailgate; and the left and right sections each have a length approximately equal to the length of the tailgate.

12. The apparatus of claim 11, wherein:

the central section is connected to the left section with a first hinge means and a first link assembly; and the central section is connected to the right section with a second hinge means and a second link assembly.

13. The apparatus of claim 12, wherein:

the first link assembly includes four legs, two legs being connected to the left section and two legs being connected to the central section, the two legs connected to the central section themselves being connected with a bearing bar which limits travel of the left section relative to the central section; and the second link assembly includes four legs, two legs being connected to the central section and two legs being connected to the right section, the two legs connected to the right section themselves being connected with a bearing bar which limits travel of the right section relative to the central section.

\* \* \* \* \*